July 10, 1962

R. A. CHRISTIE ETAL 3,043,074

MOWER LIFT DEVICE

Filed April 29, 1959

INVENTORS.
Reginald A. Christie
William R. Rowbotham

Paul O. Pippel
Atty.

July 10, 1962 R. A. CHRISTIE ETAL 3,043,074
MOWER LIFT DEVICE
Filed April 29, 1959 4 Sheets-Sheet 3
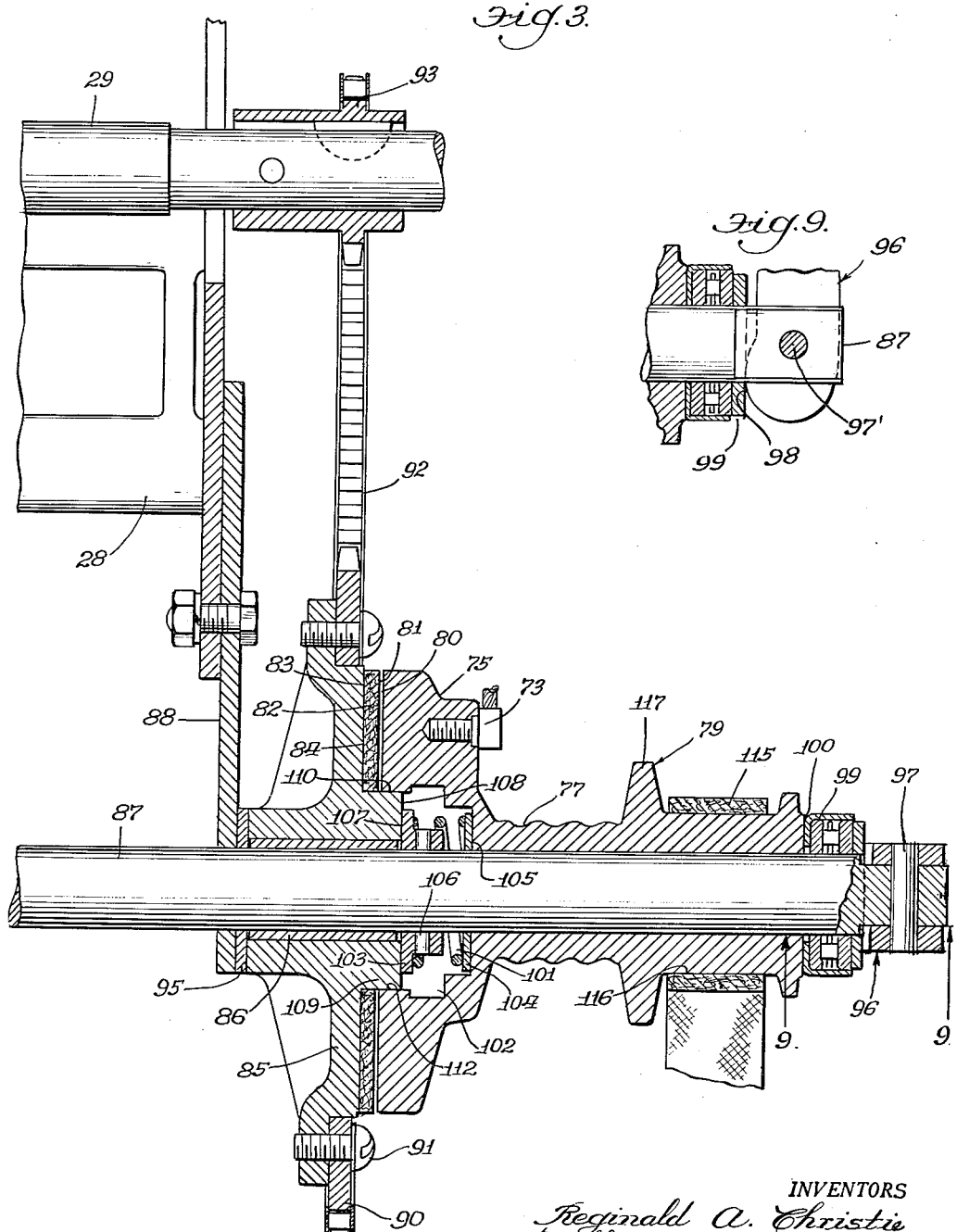
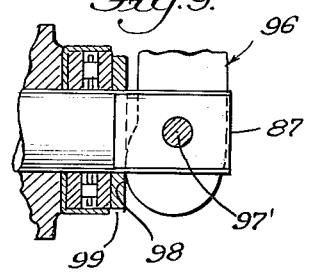
INVENTORS
Reginald A. Christie
William R. Rowbotham
Paul O. Pippel
Atty.

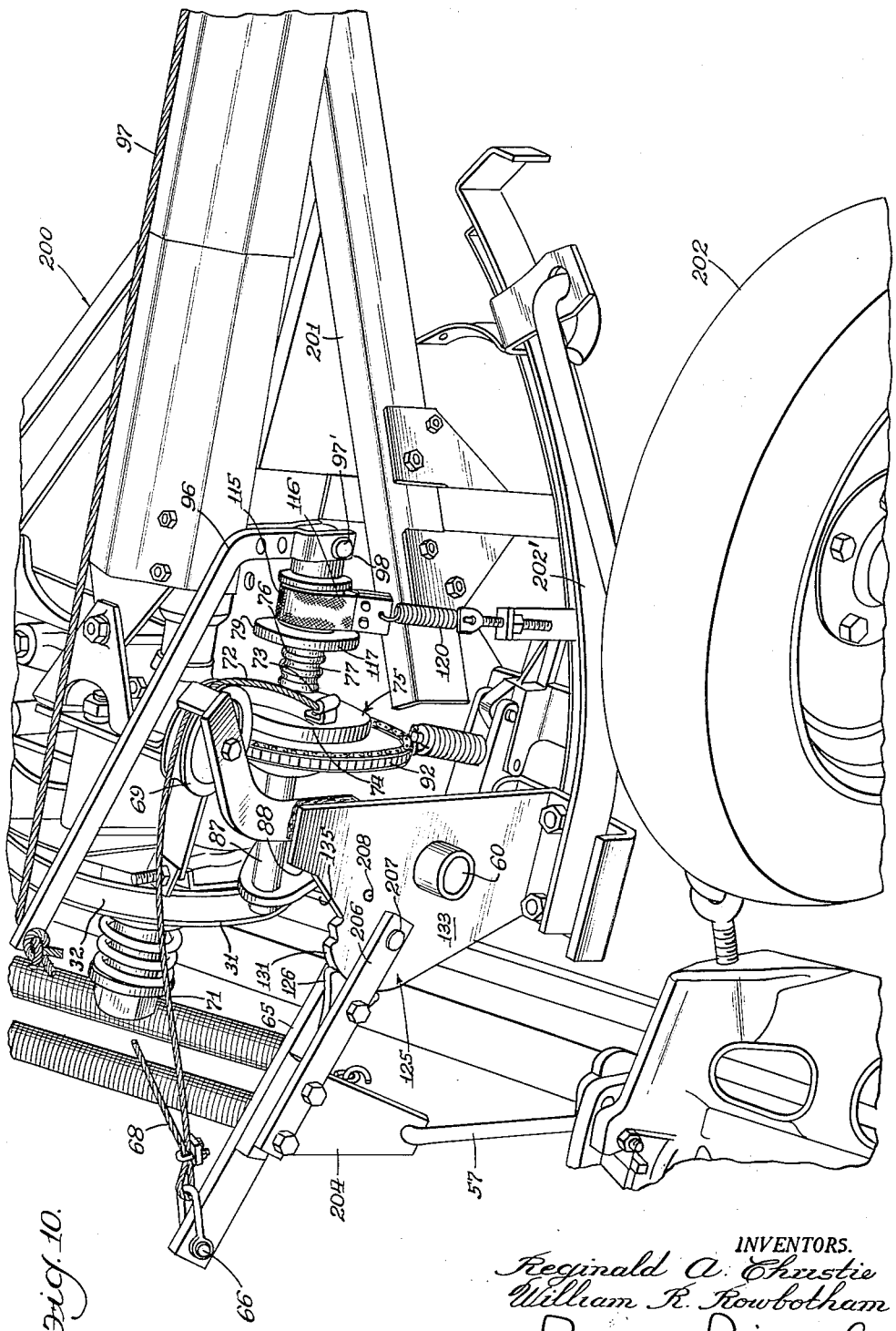

3,043,074
MOWER LIFT DEVICE
Reginald A. Christie, Ancaster, Ontario, and William R. Rowbotham, Hamilton, Ontario, Canada, assignors to International Harvester Company, Chicago, Ill., a corporation of New Jersey
Filed Apr. 29, 1959, Ser. No. 809,751
8 Claims. (Cl. 56—25)

This invention relates to mowers and more specifically to a novel device for lifting and lowering the mower.

A general object of the invention is to provide a novel power actuated lifting and lowering device for positioning the mower in transport or operating positions and to facilitate clearing obstructions while the mower is on the move.

A further object of the invention is to provide a novel mechanism for releasably holding the mower in its elevated position and which is readily releasable by a simple trip mechanism.

A more specific object of the invention is to provide a novel power actuated lift device including a clutch-operated drum for winding a mower lifting cable, the clutch operated mechanism being driven from a drive which is common with the drive for the mower for reciprocating the sickle.

These and other objects of the invention will become more apparent from the specification and the drawings, wherein:

FIGURE 3 is an enlarged sectional view taken substantially on the line 3—3 of FIGURE 1;

FIGURES 4 through 7 are somewhat diagrammatic illustrations of the latching mechanism in various positions;

FIGURE 9 is a fragmentary section taken substantially on line 9—9 of FIGURE 3; and FIGURE 10 is a fragmentary perspective view comparable to FIGURE 2 illustrating the invention applied to a mower of the trailing type.

Figure 1:
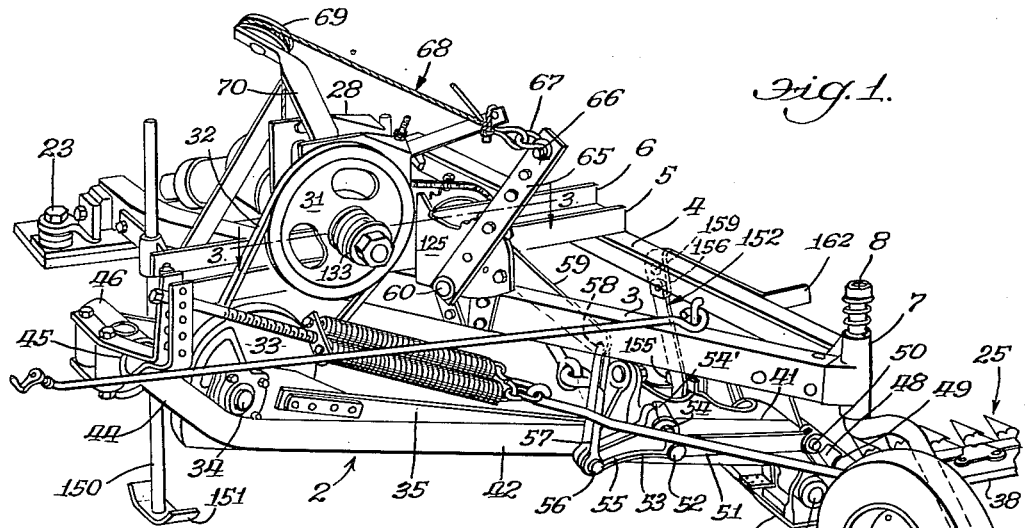
FIGURE 1 is a rear perspective view of a mower mechanism incorporating the invention.

Describing the invention in detail and having particular reference to FIGURES 1 through 9 of the drawings, there is shown a main mower frame generally designated 2 which comprises a pair of forwardly diverging side beam members 3 and 4 and interconnecting intermediate transverse beams 5 and 6, the rear ends of the members 3 and 4 being connected to a sleeve member 7 which journals the upper end of a spindle 8 on a vertical axis, the lower end of the spindle being formed to provide a wheel mounting structure 9 for mounting the caster wheel 10 as is well known to those skilled in the art.

The forward end of the A-frame 2 is provided with a transverse beam member 12 which is turned upwardly at its ends and pivoted by pins 13 and 14 on a substantially horizontal transverse axis to the forward ends 15 and 16 of the members 3 and 4 in order to accommodate vertical movement of the frame so that it, as well as the mower assembly generally designated 15, may follow terrain conditions.

The forward end 16 of the member 4 is provided with a releasable latch structure 20 which cooperates with a latch member 21 connected to the hitch plate or bar 22 which supports the member 12, the member 22 being pivoted as by a vertical nut and bolt structure 23 at the leftward side of the mower, as seen in FIGURE 1, whereby the entire mower frame structure 2 as well as the mower assembly 25 is swingable rearwardly if the mower or cutter bar assembly 25 should strike an obstruction as well known to those skilled in the art.

The hitch bar 22 is adapted for connection to an associated draft bar on a towing vehicle, the member 22 being adapted to be mounted upon such drawbar and secured thereto by means of pins (not shown) which are adapted to be passed through the holes 26 in the hitch bar 22. This is conventional practice and well known to those skilled in the art.

The beam members 5 and 6 support a journal and support structure 28 which mounts an input shaft 29, the forward end of the shaft 29 being connected through suitable knuckles and shafting 30 to an associated power source such as the power take-off of a tractor and the rear end of the shaft 29 being connected to a pulley 31 which drives a belt 32 which in turn drives a crankwheel 33, which is mounted on the main frame member 28, said crankwheel having its crank member 34, connected to one end of a pitman 35, the pitman 35 being connected as through a ball joint 36 to the sickle 37 of the mower mechanism 25. The mower is provided with the mower bar 38 which is connected to the inner shoe structure 39 which in turn is pivoted on coaxial pin 40 to the coupling yoke 41, said coupling yoke being connected to a coupling arm 42 extending stubblewardly and having a fore and aft directed inner end 44 which is pivoted as at 45 on a substantially horizontal axis in a journal structure 46 which is mounted on the members 5 and 6 of the main frame. It will be appreciated that as is conventional practice, the bar 38 and the sickle 37 are thus pivoted vertically about a horizontal fore and aft axis provided by pins 40 with respect to the coupling structure 41. Upward limited pivoting or gagging on 40 is accomplished by operating means comprising conventional operating linkage 48 which includes an upstanding lever 49 connected to the shoe structure 39 and pivoted at its upper end as at 50 to a link 51, the other end of which is pivoted as at 52 to a bell-crank lever 53 which at its elbow is pivoted as at 54 to an adjacent portion of the coupling yoke 41 and having a limit lug 53' engageable with lug 54' on yoke 41 to limit rotation of lever 53, said bell-crank lever 53 having its other arm 55 pivoted as at 56 to the lower end of a lift link 57 which at its upper end 58 is pivoted to the rear end of a lifting arm 59, the lifting arm 59 being connected to a rockshaft 60 which is supported on a substantially horizontal axis on a bearing structure 61 which is mounted on the beam member 3 of the main frame. The member or rockshaft 60 is connected to the lower end of an upstanding arm or shifting member 65 which at its upper end is pivotally connected as at 66 through a swivel member 67 to one end of an operating cable or flexible link 68 which is trained over a pulley 69 suitably carried from the framework through the supporting bracket 70 which is connected directly to the journal structure 28. The flexible element 68 is trained over the sheave 69 whereby the cable has a substantially horizontal length 71 between the upper end of the arm 65 and the pulley 69 and a downwardly extending length 72 which is anchored at its free end as at 73 to the radial plate structure 74 of a driven member 75 which is integrated with a driven drum 76, the drum having a series of driven spiral convolutions 77 for guiding the cable and wrapping the cable therearound in pursuance to lifting of the mower as hereinafter explained. The driven structure or means generally designated 79 includes the beforementioned drum 76 and the member 75, said member 75 being disposed at one end of the drum 76 and having a radial substantially annular surface 80 which is adapted for engagement with an opposing annular surface 81 on a friction ring 82 which is made of conventional clutch facing material, the ring 82 having an opposite surface 83 which engages a side 84 on a drive sprocket 85 which is journalled on an anti-friction bearing 86 from a support shaft 87, the shaft 87 being mounted on the frame and a mounting bracket 88 which is connected suitably to the journal structure 28. The drive member or means 85 is herein shown as separate from the sprocket ring 90 which is bolted thereto as at 91 but for all intents and purposes the ring 90 and the member 85 may be considered as a unit. The sprocket 90 is driven by a drive chain 92 which in turn is driven by the drive sprocket 93 which is keyed to the shaft 29 and constrained for rotation therewith. It will be understood that the driving system which includes the sprockets 93, 85 and chain 92, as well as the clutch system which includes the member 81 and the surfaces which it contacts, are adapted to selectively drive the drum 76 pursuant to axial actuation or movement of the member 79 toward the member 85, which although rotatable, is limited in axial movement through abutment with a washer 95 against the support arm 88. The movement axially of member 79 into driven position is accomplished by the lever 96 which at its upper end is connected to a cable or rope 97 suitably extending forwardly to the associated tractor, the lever 96 being pivoted at its lower end on a pin 97' which extends through the shaft 87 which is fixedly mounted on the arm 88, the arm 97 having a lower end cam surface 98 which engages an end thrust bearing 99 which bears against the adjacent end 100 of the member or casting 79 which in turn urges the member 79 to leftwardly as shown in FIGURE 3 engaging the surface 80 against 81 and 82 against 84 so that the entire assembly rotates in toto. Release of the lever 96 automatically disposes the parts in neutral by the action of the spring 101 which is pocketed in a recess 102 and operates through frictionless washers 103 and 104 at the ends of the spring 101, the washer 104 engaging the surface 105 on the portion 74 and the washer 103 being keyed as by pin 106 to the shaft 87 and providing a guide surface 107 on an adjacent side 108 on a hub 109 of the member 85, the hub 109 extending through a central opening 110 in the friction member 81 and positioning the same with the relation of surfaces 80 and 84 and the periphery 110 of the hub or boss 109 serving as a guide and a journal against the surface 112 of the bore 102 of member 74. It will be noted that in the released or in the neutral position, the member 79 is stationary and in the operating position, in order to prevent overrunning and consequent or reverse wrapping or slack in the cable with deleterious effect thereto, there is provided a brake or snubbing means comprising a band of friction material 115 which engages and is wrapped around a drum portion 116 which is formed as an extension of the drum 76 beyond a radial flange 117 which is disposed intermediate friction drum 116 and the cable drum 76, the brake band being in the form of a loop and being connected to one end of a tension spring 120, the other end of which is connected by a hook structure 121 to the adjacent side member 4 of the main frame mower structure.

The invention also features in the operating linkage as best seen in FIGURES 4 through 7 a novel locking mechanism generally designated 125 comprising a star wheel or detent 126 rotatably mounted by a pin 127 extending through a central opening 128 in the center of the substantially equilateral triangular-shaped star shaped locking member 126, said star member comprising front, rear and upper points 130, 130' and 130", and three concave sides 131 which are adapted to slide on the positioning surface 132 of stationary member 133 in the released position of the mechanism when the lever carrying the star wheel is in its rearwardmost position as best seen in FIGURE 1.

Figure 2:
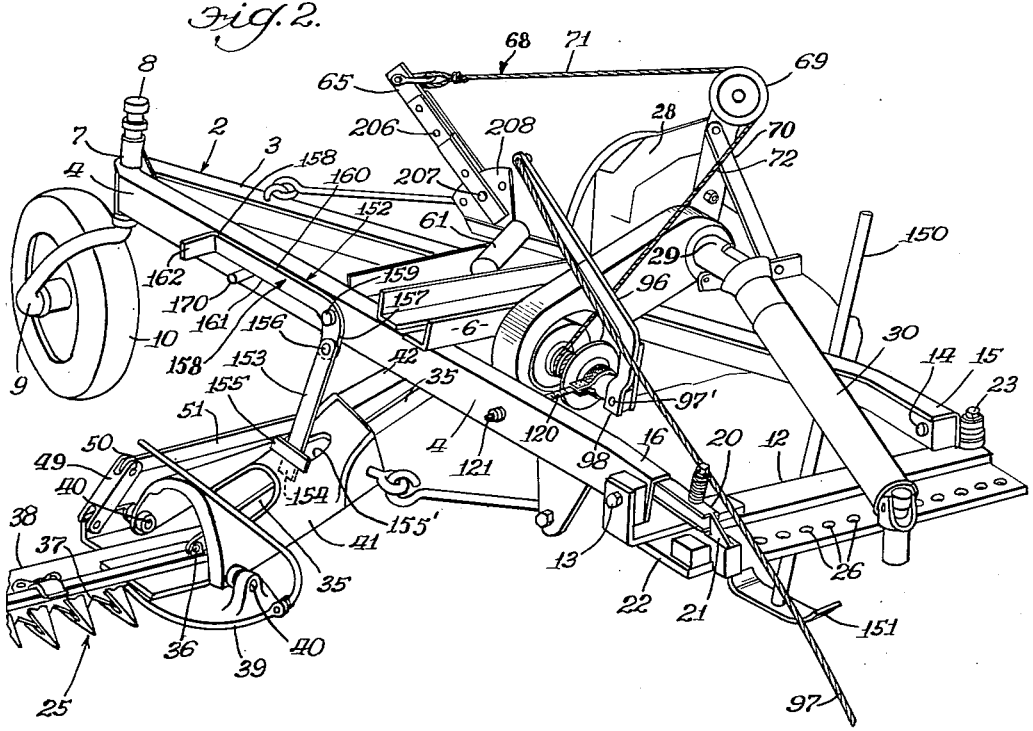
FIGURE 2 is a front side perspective view of the mechanism shown in FIGURE 1.

Considering the mower in its lowermost operating position, it will be seen that it has limited vertical floating movement about the pivot 45 as well as about the pivot pins 40. Upon the mower approaching an obstruction where the operator desires to raise the mower, he pulls forwardly on the cable 97 rotating lever 96 forwardly and end 98 rearwardly (FIGS. 2 and 9) thus shifting the member 79 (FIGURE 3) rearwardly or to the left engaging the surface 80 with the surface 81 of the member 82 which in turn engages the surface 83 with the driven surface 84, thus rotating the entire assembly 79 and wrapping the cable length 72 about the drum convolutions 77 thus in turn drawing the length 71 forwardly and rotating the lever 65 forwardly in a clockwise direction as shown in FIGURE 2. The surface 131 of detent 126 which complemently engages the surface 132 in the rearwardmost or released position of the mechanism guides the star wheel so that its path of movement will be such that one of its points or momentarily forward point 130 (FIGURE 1) will engage the front tooth 135 which is disposed ahead of the star wheel on the member 133 along the top edge thereof at the front of the irregularly shaped cutout 135. Upon engagement of the wheel of front point 130 with the tooth 131, forward movement of the lever 65 is arrested and the clutch mechanism slips. The operator then releases the cable 97 which throws the driving mechanism into neutral allowing a part of the cable 68 to unwind from the drum so that the lever 65 is allowed to swing rearwardly or in a clockwise direction (FIGURE 5) thus engaging the momentarily rear point 130' (FIGURES 4, 5 and 6) with the tooth 136 rearwardly of the wheel 126. Since the force tending to move the lever 65 rearwardly is opposed by the alignment of the point of contact of the tooth 130' with the holding tooth 136 because the load in transmitted through the center of the pivot pin 127, the mower is disposed in elevated position. After the obstruction is passed over, if the operator desires to drop the mower again, he pulls on the cable 97 forwardly actuating the drive mechanism again pulling the cable of the power lift device so that the link 71 of the cable is drawn forwardly and swinging the lever 65 in a clockwise direction (FIGURE 2) or in a counterclockwise direction as seen in FIGURE 6 whereby the forward point 130 which has been raised and positioned by the profile of tooth 136 and the ledge 137 thereunder is caused to ride up the ramp 138 forwardly and above the turning tooth 135 so that the rear end point 130' is caused to descend below the ledge or overriding tooth 137 into the irregularly shaped cut-out 138 and engage in front of the turning cam tooth surface 139 whereby when the operator releases the cable 97 the star wheel will rotate and override the tooth 136 as seen in phantom lines in FIGURE 6 and assume the position shown in FIGURE 7 with a surface 131 engaging the surface 132 on the rear edge of the member 133 and thus the locking mechanism is conditioned to go again through the cycle.

Figure 8:
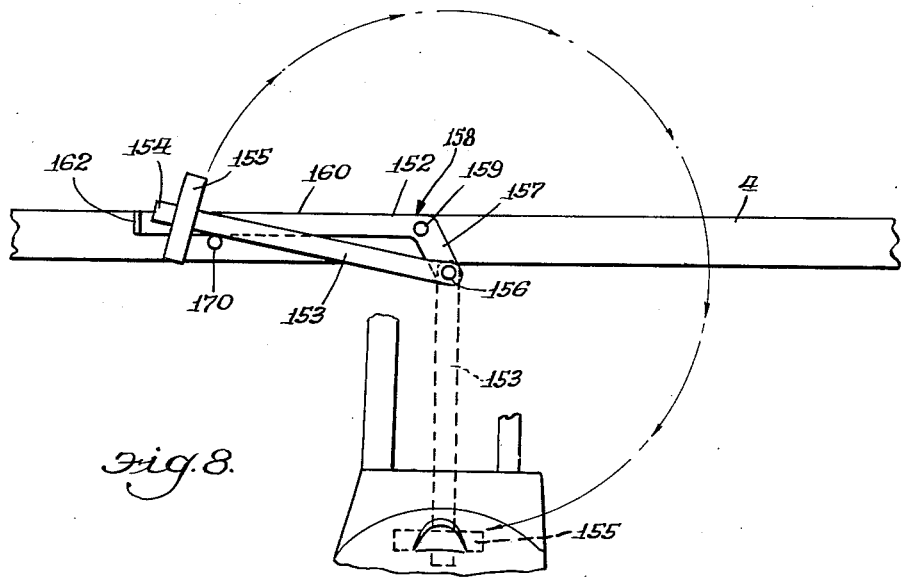
FIGURE 8 is an enlarged side elevational view of a portion of the parking linkage shown in transport position.

In FIGURES 1 through 9, the mower illustrated is of the semi-mounted type which includes the rear caster wheel support 10 and the front hitch mounting beam 22. In the dismounted position, that is when it's removed from the tractor, the leftward side, viewing the implement from the rear, is supported by a conventional stand 150 which is releasably secured to the frame member 3 adjacent to its forward end, the stand 150 having a foot 151 adapted to rest on the ground. The opposite side of the implement is supported by a novel latching mechanism generally designated 152. The latch mechanism 152 comprises a dependent support member 153 which at its lower end 154 enters into an opening 155' in the top side of the yoke structure or casting 41 of the mower. The yoke structure as best seen in FIGURE 2 slopes downwardly and outwardly and thus provides a sort of wedging action for the cross member 155 which is connected to the lower end of the member 53 and prevents or limits downward movement of the member 153 in the supporting position of the structure 152. The upper end of the member 153 is pivoted as at 156 to one lever arm 157 of a combination bell-crank and lever member generally indicated 158, the member 158 being pivoted at its elbow by a pin or a nut and bolt assembly 159 which is connected to the member 4 of a main frame structure and as best seen in FIGURE 2, the other arm 160 of the member 158 extends rearwardly of the pivot 159 whereas the pivot pin 156 is forwardly of the point 159 whereby the weight of the associated side of the mower structure biases the lever assembly 158 to rotate in a counterclockwise direction (FIGURE 2) whereby engaging the lower edge 161 of the arm portion 160 against the stop or pin 170 which is underposed with respect to the arm and connected to the member 4 of the main frame structure. It will be seen that the outer end of the arm 160 is bent outwardly to provide a handle or hand hold portion 162 whereby the unit may be readily manipulated. It will be understood that the parking apparatus 152 is used only when the structure is disassociated from the supporting tractor so that the forward end of the mower framework may be maintained at the level of the drawbar for easy connection. In the operating position of the mower, the parking structure 152 is positioned with the parking leg 153 folded over and seated against the pin 170. In order to remove the structure 152 from its parking position to the supporting position of the mower, the forward drawbar 22 is connected to the drawbar of the tractor whereupon the jack 150 is elevated in the usual way by unbolting and raising it so that the foot 151 clears the ground. Then the parking assembly 152 is unlatched by grasping the handle 162 and rotating the lever 158 in a clockwise direction (FIGURE 2) whereupon the pivot point 156 is moved rearwardly of the point 159 and then by continued rotation of the lever assembly 158 in a clockwise direction, the leg 153 is elevated sufficiently to clear the lower end 154 from the confining opening 155 and as the handle 162 is rotated past a certain point, the member 153 is then accommodated to be swung in a counter-clockwise direction (FIGURE 2) about the point 156 and folded along side the arm 160 and then both the members 153 and 158 are positioned as shown in FIGURE 8.

Referring now to the construction shown in FIGURE 10, it will be seen that the operating mechanism as well as most of the mower structure is identical with that shown in the previous embodiment and therefore parts which are identical with those in the previous modification are identified with corresponding reference numerals. In the present embodiment the mower structure chosen by way of illustration designated 200 is of the trailing type and comprises a main frame structure 201 including supporting wheels 202 and is of the type generally shown in copending U.S. patent application Serial No. 634,641, filed January 17, 1957 by Thomas Scarnato et al. for Mower Operating Mechanism and now U.S. Patent No. 2,895,277.

In the present instance, it will be seen that the spring 120 is connected to the guide rail 202' of the main frame structure, the said mower being somewhat of the type shown in the beforementioned copending application in the name of Thomas Scarnato et al. for Mower Operating Mechanisms, Serial No. 634,641, filed January 17, 1957 now U.S. Patent 2,895,277. The present embodiment differs from the preceding one principally in the relocation of certain parts for convenience in the instant structure such as directly connecting to the lever 65 the linkage 57 through a bracket 204. However, the latching structure or detent means 125, 126 is the same as in the previous embodiment. Of course, shaft 60 in the instant embodiment has been shortened to provide a pivot for the lower end of the lever 65 and as in the previous embodiment this lever carries a flanking holder 206 which with the lever 65 embraces the member 125, the lower end of the member 206 being provided with an aperture 207 which is alignable with an opening 208 in the plate structure 125 whereby the lever 65 may be locked in the mower elevating position by means of a suitable pin which is passed through the openings 207 and 208 so as to provide a positive lock during transport and the like.

Several forms of the invention have been illustrated in order to show the adaptability of the unit to various different types of mowers, however, it is to be understood that the embodiments herein presented are merely illustrative and are not intended to be limiting of the scope of the invention which is to be gauged only by the nature of the appended claims.

What is claimed is:

1. In a mower having a frame and a cutter bar assembly, means pivotally mounting the cutter bar assembly on the frame enabling vertical swinging movement of the cutter bar assembly between a position upon the ground and an elevated position off the ground, drive means carried on the frame and operatively connected to the cutter bar assembly for driving the latter, driven means on the frame, said driven means comprising a shaft and an element rotatable thereon and means selectively and releasably connecting said element to said driving means, a drum connected to said element, a flexible member connected to said element for winding upon the drum attendant to said element being driven, an operating linkage operatively connected to said mower assembly and said member, and a brake operatively associated with said drum for resisting rotation thereof in winding and unwinding directions of rotation of the drum.

2. In a mower having a frame and a cutter bar assembly, means pivotally mounting the cutter bar assembly on the frame enabling vertical swinging movement of the cutter bar assembly between a position upon the ground and an elevated position off the ground, drive means carried on the frame and operatively connected to the cutter bar assembly for driving the latter, driven means on the frame in driven relation by the drive means, said driven means comprising a shaft and an element rotatable thereon and means selectively and releasably connecting said element to said driving means, a drum connected to said element, a flexible member connected to said element for winding upon the drum attendant to said element being driven, a lifting linkage on the frame operatively connected to said mower assembly and said member, and snubbing means operatively associated with the drum for resisting rotation thereof in directions winding and unwinding said flexible element with respect thereto.

3. A mower comprising a frame and a mower bar assembly, means pivotally mounting the mower bar assembly on the frame enabling vertical swinging movement of the mower bar assembly, a power lift device on the frame, operating means operative between the power lift device and the mower bar assembly for swinging the mower bar assembly in an upward direction in response to operation of the power lift device and including releasable detent means for releasably holding said assembly in raised position, and operator actuated releasing means operatively associated with the detent means for releasing the same, and said detent means comprising a lever pivoted on the frame, a star wheel rotatably carried thereby, and a detent structure on the support cooperatively associated with the star wheel.

4. A mower comprising a frame and a mower bar assembly, a pivotal mounting for the mower bar assembly on the frame enabling vertical swinging movement of the mower bar assembly, a power lift device on the frame, operating means operative between the power lift device and the mower bar assembly for swinging the mower bar assembly in an upward direction in response to operation of the power lift device and including releasable detent means for releasably holding said assembly in raised position, and operator-actuated releasing means operatively associated with the detent means for releasing the same, and said power lift device comprising a drive member, a driven member axially separated from the drive member and including a drum portion rotatable with the driven member and said operating means comprising a cable connected to said driven member for wrapping about the drum, and shifting means operative to engage said members.

5. The invention according to claim 4 and an extension on the drum, a supported brake band continuously engaging the extension for snubbing free rotation of the drum upon release of the driven member.

6. A mower comprising a frame and a mower bar assembly, means pivotally mounting the mower bar assembly on the frame enabling vertical swinging movement of the mower bar assembly, a power lift device on the frame, operating means operative between the power lift device and the mower bar assembly for swinging the mower bar assembly in an upward direction in response to operation of the power lift device and including releasable detent means for releasably holding said assembly in raised position, and operator-actuated releasing means operatively associated with the detent means for releasing the same, and said detent means including a swinging member on the frame, a catch element on the frame, a star wheel rotatably mounted on the swinging member and having three equidistantly spaced front, rear and upper points, said catch element having spaced front and rear teeth and an intervening cavity, and a slide surface rearwardly of the rear tooth concentric with the axis of rotation of the swinging member, said star wheel having peripheral surfaces between each pair of points complementary to the slide surface and sliding thereon in the released position of said detent means, said swing member swingable to a position engaging the front point of the star wheel with said front tooth positioned in the path thereof to limit forward movement of the swing member and rotate the wheel to position a rear point adjacent to the rear tooth in locking position therewith upon release of the swinging member, said rear tooth arranged to elevate the front point above the front tooth to permit forward swinging of said member, a ramp on said element extending diagonally upwardly from the front tooth and engaging the front point for rotating the same and depressing the rear point into the cavity, an overriding tooth on said element at the rear of the cavity for engaging the rear point upon rearward swinging of the member and rotating the wheel in overriding relation to the rear tooth.

7. A mower comprising a frame and a mower bar asembly, means pivotally mounting the mower bar assembly on the frame enabling vertical swinging movement of the mower bar assembly, a power lift device on the frame, operating means operative between the power lift device and the mower bar assembly for swinging the mower bar assembly in an upward direction in response to operation of the power lift device and including releasable detent means for releasably holding said assembly in raised position, and operator actuated releasing means operatively associated with the detent means for releasing the same, said detent means comprising a shifting member pivoted on the frame, a stationary member on the frame having an irregular cut-out portion, and a rotatable detent movable with the shifting member and engaging the cut-out portion in the stationary member.

8. A mower comprising a frame, a mower assembly pivoted on the frame, a drive therefor operating mechanism, linkage interconnecting the mechanism and mower assembly for raising and lowering the latter attendant to operation of the former and clutch-connected to the drive, automatic releasable latching means in the linkage holding the mower in raised position upon its being moved to said position, and brake means engaged with said linkage for snubbing operational movement thereof.

References Cited in the file of this patent

UNITED STATES PATENTS

| | | |
|---|---|---|
| 2,533,804 | Hitchcock | Dec. 12, 1950 |
| 2,624,999 | Goodnight | Jan. 13, 1953 |
| 2,686,658 | Hill et al. | Aug. 17, 1954 |
| 2,826,029 | West | Mar. 11, 1958 |